US012066102B1

(12) United States Patent
Staley et al.

(10) Patent No.: US 12,066,102 B1
(45) Date of Patent: Aug. 20, 2024

(54) BELT DRIVE SYSTEM WITH FORWARD FED TORSIONAL LOAD ADJUSTMENT

(71) Applicant: GM Global Technology Operations LLC, Detroit, MI (US)

(72) Inventors: Eric D. Staley, Flushing, MI (US); Todd M. York, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/450,129

(22) Filed: Aug. 15, 2023

(51) Int. Cl.
*F16H 7/08* (2006.01)

(52) U.S. Cl.
CPC ....... *F16H 7/08* (2013.01); *F16H 2007/0885* (2013.01)

(58) Field of Classification Search
CPC ..... F02B 67/06; F16H 7/08; F16H 2007/0885
USPC .................................................. 474/101, 110
See application file for complete search history.

(56) References Cited

U.S. PATENT DOCUMENTS

| | | | | |
|---|---|---|---|---|
| 4,454,236 A | * | 6/1984 | Foster ..................... | F16H 7/129 474/135 |
| 4,478,595 A | * | 10/1984 | Hayakawa ............. | F16H 7/1263 474/110 |
| 4,885,493 A | * | 12/1989 | Gokhale ................ | H02K 21/14 322/51 |
| 5,144,220 A | * | 9/1992 | Iwatani ................. | H02J 7/1446 322/73 |
| 5,203,233 A | * | 4/1993 | Hattori .............. | F16H 61/66272 474/18 |
| 5,284,116 A | * | 2/1994 | Richeson, Jr. ........ | F02P 5/1502 123/480 |
| 5,286,233 A | * | 2/1994 | Engelstad ............. | F16H 7/1281 474/101 |
| 5,733,214 A | * | 3/1998 | Shiki ........................ | F01L 1/02 474/69 |
| 5,918,729 A | * | 7/1999 | Chang .................... | B65G 23/44 198/810.04 |

(Continued)

FOREIGN PATENT DOCUMENTS

| | | |
|---|---|---|
| DE | 60110528 T2 | 1/2006 |
| DE | 102009047116 A1 | 5/2011 |
| DE | 102016216461 A1 | 3/2018 |

OTHER PUBLICATIONS

German Patent and Trademark Office, Office Action for German App. No. 102023133467.0, mailed Apr. 17, 2024.

*Primary Examiner* — Henry Y Liu
(74) *Attorney, Agent, or Firm* — Honigman LLP; Matthew H. Szalach; Jonathan P. O'Brien

(57) ABSTRACT

A belt drive system for an internal combustion engine rotatably coupled to a rotary motor is provided. The internal combustion engine includes at least three cylinders each having a piston operable to turn a crankshaft. The belt drive system includes a belt and a controller. The belt is coupled to crankshaft of the internal combustion engine and the rotary motor; and the controller is operatively connected to the rotary motor, wherein the controller causes data processing hardware to perform the following operations: apply a torque to the rotary motor; and change the torque of the rotary motor prior to a change in a rotary speed of the internal combustion engine to maintain a predetermined tension in the belt and reduce a rotary motor torsional response through the belt drive to the torsional vibration input from the internal combustion engine.

20 Claims, 7 Drawing Sheets

(56) References Cited

U.S. PATENT DOCUMENTS

| | | | | |
|---|---|---|---|---|
| 6,531,849 B2* | 3/2003 | Nakamura | H02P 9/08 | 322/17 |
| 6,666,784 B1* | 12/2003 | Iwamoto | F01L 9/20 | 137/554 |
| 6,746,352 B1* | 6/2004 | Poiret | F01L 1/024 | 474/101 |
| 6,849,011 B2* | 2/2005 | Calfa | F16H 7/1281 | 474/135 |
| 6,998,823 B2* | 2/2006 | Albertson | F02D 41/0087 | 123/195 A |
| 7,217,206 B2* | 5/2007 | Stone | F16H 7/1281 | 474/110 |
| 7,226,377 B2* | 6/2007 | Kraus | F16H 7/1209 | 474/135 |
| 7,523,734 B2* | 4/2009 | Albertson | B60W 10/06 | 123/192.1 |
| 7,552,708 B2* | 6/2009 | Serkh | F16H 7/1218 | 123/198 R |
| 7,699,732 B2* | 4/2010 | Message | F16H 7/1281 | 474/135 |
| 7,771,302 B2* | 8/2010 | Pendergrass | F16H 7/1281 | 474/109 |
| 8,137,222 B2* | 3/2012 | Cottrell, V | F16H 7/1281 | 474/101 |
| 8,166,945 B2* | 5/2012 | Spicer | F16D 27/112 | 123/179.25 |
| 8,215,282 B2* | 7/2012 | McDonald | B60W 10/30 | 290/40 C |
| 9,297,445 B2* | 3/2016 | Kees | F16H 7/08 | |
| 9,303,571 B2* | 4/2016 | Yu | B60K 6/485 | |
| 9,334,932 B2* | 5/2016 | Antchak | F16H 7/1281 | |
| 9,512,794 B2* | 12/2016 | Serrano | F02D 41/0002 | |
| 9,533,601 B2* | 1/2017 | Hashimoto | B60L 15/2045 | |
| 9,599,199 B2* | 3/2017 | Graves | F16F 3/04 | |
| 9,989,129 B2* | 6/2018 | Antchak | F16H 7/1263 | |
| 10,018,254 B2* | 7/2018 | Wright | F16H 7/02 | |
| 10,221,786 B2* | 3/2019 | Serrano | B60W 30/20 | |
| 10,245,971 B2* | 4/2019 | Liu | F02D 41/062 | |
| 10,518,653 B2* | 12/2019 | Liu | B60L 15/007 | |
| 10,830,166 B2* | 11/2020 | Serrano | F02D 41/307 | |
| 11,136,928 B2* | 10/2021 | Serrano | F02D 41/0002 | |
| 11,220,956 B2* | 1/2022 | Heckel | F02B 63/042 | |
| 11,359,562 B2* | 6/2022 | Serrano | F02D 41/307 | |
| 2002/0052260 A1* | 5/2002 | Kitamura | F16H 7/1281 | 474/135 |
| 2002/0128099 A1* | 9/2002 | Winklhofer | F01L 1/024 | 474/101 |
| 2003/0083803 A1* | 5/2003 | Serkh | F16H 7/14 | 123/195 A |
| 2003/0236143 A1* | 12/2003 | Tange | F16G 5/16 | 474/101 |
| 2004/0097309 A1* | 5/2004 | Kirstein | F16H 7/0827 | 474/138 |
| 2005/0014586 A1* | 1/2005 | Simpson | F01L 1/02 | 474/111 |
| 2005/0029991 A1* | 2/2005 | Albertson | F02D 41/1498 | 322/29 |
| 2005/0192142 A1* | 9/2005 | Stone | F01L 1/024 | 474/112 |
| 2005/0209034 A1* | 9/2005 | Ellsworth | G01L 5/102 | 474/101 |
| 2005/0261094 A1* | 11/2005 | Foster | F16H 7/1236 | 474/101 |
| 2005/0282668 A1* | 12/2005 | Ali | F16H 7/1281 | 474/101 |
| 2006/0172834 A1* | 8/2006 | Laubender | G01B 17/08 | 474/101 |
| 2006/0178240 A1* | 8/2006 | Hansel | F16H 7/1281 | 474/135 |
| 2006/0240922 A1* | 10/2006 | Pendergrass | F16H 7/1281 | 474/102 |
| 2006/0276284 A1* | 12/2006 | Lancaster | F16H 7/1263 | 474/133 |
| 2007/0080037 A1* | 4/2007 | Larry | F16D 37/008 | 123/198 R |
| 2007/0099749 A1* | 5/2007 | Zillmer | F02N 11/00 | 477/3 |
| 2007/0142145 A1* | 6/2007 | Namuduri | F16H 7/1236 | 474/101 |
| 2009/0156340 A1* | 6/2009 | Seo | F16H 7/1281 | 474/113 |
| 2009/0195203 A1* | 8/2009 | Yurgil | B60W 10/08 | 903/930 |
| 2009/0298646 A1* | 12/2009 | Parsons | F16D 41/07 | 474/171 |
| 2010/0065001 A1* | 3/2010 | Spicer | F02N 11/003 | 180/65.21 |
| 2010/0102783 A1* | 4/2010 | McDonald | B60W 30/20 | 322/23 |
| 2010/0137083 A1* | 6/2010 | Carlson | F16H 7/1218 | 474/110 |
| 2011/0081996 A1* | 4/2011 | Geraghty | F02B 67/06 | 474/101 |
| 2011/0190083 A1* | 8/2011 | Harrison, III | F16H 7/02 | 474/101 |
| 2012/0065009 A1* | 3/2012 | Mueller | F02B 67/06 | 474/101 |
| 2012/0081051 A1* | 4/2012 | Kobayashi | B60W 10/08 | 903/930 |
| 2012/0083953 A1* | 4/2012 | Izawa | B60L 50/16 | 180/65.265 |
| 2012/0158226 A1* | 6/2012 | Prucka | B60K 6/485 | 701/22 |
| 2012/0197473 A1* | 8/2012 | Kshatriya | B60K 6/485 | 903/903 |
| 2012/0259510 A1* | 10/2012 | Detrois | F16H 7/1281 | 474/101 |
| 2012/0318589 A1* | 12/2012 | Staley | F16H 7/1281 | 474/134 |
| 2013/0005523 A1* | 1/2013 | Suchecki | F01L 1/022 | 474/101 |
| 2013/0172137 A1* | 7/2013 | Antchak | B60K 25/02 | 474/133 |
| 2013/0288835 A1* | 10/2013 | Hauck | F02N 11/003 | 474/87 |
| 2014/0130635 A1* | 5/2014 | Kees | F02N 15/08 | 474/101 |
| 2015/0260264 A1* | 9/2015 | Petridis | F16H 7/08 | 474/101 |
| 2016/0052422 A1* | 2/2016 | Hashimoto | B60L 15/2045 | 903/902 |
| 2016/0065107 A1* | 3/2016 | Klein | F02B 67/06 | 290/31 |
| 2016/0201586 A1* | 7/2016 | Serrano | F02D 41/0002 | 701/111 |
| 2017/0051689 A1* | 2/2017 | Serrano | F02D 41/0002 | |
| 2017/0267229 A1* | 9/2017 | Hashimoto | B60W 10/06 | |
| 2017/0343083 A1* | 11/2017 | Wright | F02B 67/06 | |
| 2018/0202379 A1* | 7/2018 | Nagashima | F02D 41/1497 | |
| 2018/0251041 A1* | 9/2018 | Liu | B60L 15/20 | |
| 2019/0145329 A1* | 5/2019 | Serrano | B60W 30/20 | 701/111 |
| 2019/0176647 A1* | 6/2019 | Liu | F02D 31/001 | |
| 2019/0263382 A1* | 8/2019 | Parsels | B60W 30/20 | |
| 2021/0071605 A1* | 3/2021 | Serrano | F02D 41/0087 | |
| 2021/0189980 A1* | 6/2021 | Parsels | F02D 41/3058 | |
| 2021/0396189 A1* | 12/2021 | Serrano | F02D 41/307 | |
| 2022/0154636 A1* | 5/2022 | Vaughn | B60K 25/02 | |
| 2023/0287839 A1* | 9/2023 | Parsels | B60K 6/485 | |

* cited by examiner

BELT DRIVE SYSTEM WITH FORWARD FED TORSIONAL LOAD ADJUSTMENT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to a belt drive system for coupling a rotary motor to an internal combustion engine. The belt drive system includes a first pulley coupled to the rotary motor and a second pulley coupled to a crankshaft of the internal combustion engine. A belt is coupled to the first pulley and the second pulley to transfer torque between the internal combustion engine and the rotary motor. For instance, in some aspects, torque is transferred from the internal combustion engine to the rotary motor, which is converted into electric power to charge a battery. Alternatively, torque is transferred from the rotary motor to the crankshaft to assist in the rotation of the crankshaft, thereby improving the efficiency of the internal combustion engine.

In operation, the rotary speed of the crankshaft may be out of synch with the rotary speed of the rotary motor such that the rotary motor and the internal combustion engine operate out-of-phase with each other. This may result in a slack in the belt or an increased load on the belt. In such instances, a system load may applied to the rotary motor by a torsional vibration of the crankshaft caused by a change in momentum of the engine. For example, in the case where a slack exists, the torsional load is applied when the rotary speed of the rotary motor and the crankshaft equalize. Accordingly, it remains desirable reduce the torsional load.

SUMMARY

In one configuration, a belt drive system for an internal combustion engine rotatably coupled to a rotary motor is provided. The internal combustion engine includes at least three cylinders, each cylinder includes a piston operable to turn a crankshaft. The belt drive system includes a belt disposed in a belt run that includes a first pulley coupled to a crankshaft of the internal combustion engine and a second pulley coupled to the rotary motor. The belt drive system further includes a controller operatively connected to the rotary motor. The controller includes data processing hardware and memory hardware, the memory hardware storing instructions that when executed on the data processing hardware cause the data processing hardware to perform operations including: applying a torque to the rotary motor and changing the torque of the rotary motor prior to a change in a rotary speed of the internal combustion engine to maintain a predetermined tension in the belt and reduce a rotary motor torsional response through the belt to a torsional vibration input from the internal combustion engine.

The system may include one or more of the following optional features. For example, the controller may be configured to increase torque of the rotary motor prior to a crankshaft acceleration of the internal combustion engine.

In one configuration, the controller is configured to decrease a torque of the rotary motor prior to a crankshaft deceleration of the engine. Additionally or alternatively, the controller may be configured to instruct the rotary motor to provide an accelerating torque prior to a piston expansion and a regenerative torque prior to a piston compression. The accelerating torque and the regenerative torque may be asymmetric with respect to each other.

In one configuration, the controller may be configured to maintain the torque of the rotary motor when a cylinder of the internal combustion engine does not fire. The controller may be configured to change the torque with respect to an angular position of the crankshaft. For instance, the controller may be configured to change the torque when the crankshaft is between 42 and 50 degrees before top dead center. The belt drive system may further include a crank sensor configured to detect the angular position of the crankshaft. Finally, the accelerating torque and the regenerative torque are asymmetric with respect to each other to retain a net zero energy balance.

In another configuration, a method for controlling operation of a rotary motor that is rotatably coupled to an internal combustion engine via a belt is provided. The method includes actuating the rotary motor to apply a torque to the internal combustion engine through the belt, determining a change in a rotary speed of the internal combustion engine, and changing the torque of the rotary motor prior to the change in a rotary speed of the internal combustion engine to maintain a predetermined tension in the belt and reduce a rotary motor torsional response through the belt to a torsional vibration input from the internal combustion engine.

The method may include one or more of the following features. For example, the torque of the rotary motor may be increased prior to a crankshaft acceleration of the internal combustion engine. Additionally or alternatively, the method may further include decreasing a torque of the rotary motor prior to a crankshaft deceleration of the internal combustion engine.

In one configuration, the rotary motor may generate an accelerating torque prior to a piston expansion and a regenerative torque prior to a piston compression. In such an aspect, the accelerating torque and the regenerative torque may be asymmetric with respect to each other. The torque of the rotary motor may be maintained when a cylinder of the internal combustion engine does not fire. Additionally or alternatively, the method may include detecting an angular position of the crankshaft. In such an aspect, the torque of the rotary motor may change with respect to the angular position of the crankshaft. For instance, the torque of the rotary motor may be changed when the crankshaft is between 42 and 50 degrees before top dead center.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1A:
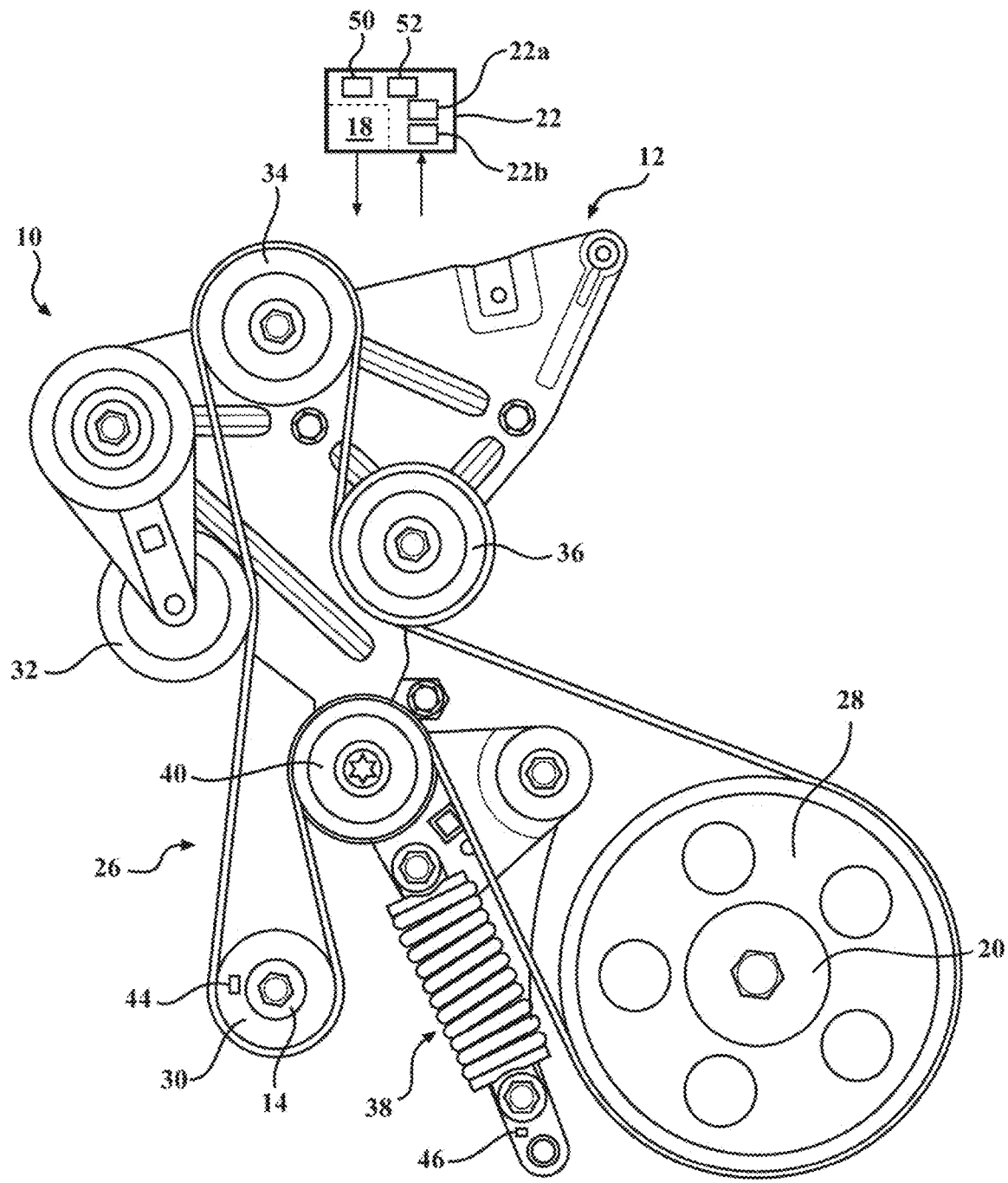
FIG. 1A is a schematic view of a belt drive system according to the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising." "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on." "engaged to," "connected to." "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below; the term module may be replaced with the term circuit. The term module may refer to, be part of, or include an Application Specific Integrated Circuit (ASIC): a digital, analog, or mixed analog/digital discrete circuit: a digital, analog, or mixed analog/digital integrated circuit: a combinational logic circuit: a field programmable gate array (FPGA): a processor (shared, dedicated, or group) that executes code; memory (shared, dedicated, or group) that stores code executed by a processor: other suitable hardware components that provide the described functionality: or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory. Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry. e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data. e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well: for example, feedback provided to the user can be any form of sensory feedback, e.g., visual feedback, auditory feedback, or tactile feedback: and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

A system and method may process various engine and vehicle operating conditions to modify a torque command to reduce a torsional load on the engine and or pulleys associated with the vehicle powertrain. In one aspect, the modified torque command is forward fed to keep a rotary motor in phase with an engine. For instance, the modified torque command is actuated by the rotary motor to precede a crankshaft acceleration of the engine.

Additionally, the system and method may be configured to time the processing of the modified torque command prior to a piston expansion and a piston compression, wherein a boost torque command is modified and processed prior to a piston expansion and a generative torque command is modified and processed prior to a piston compression. The modified torque command may be delivered to a selected piston or all the pistons based upon an operating condition of the vehicle. For instance, if the engine is operating in a dynamic fuel management condition, the torque command is modified and applicable to the active or otherwise firing piston.

Figure 1B:
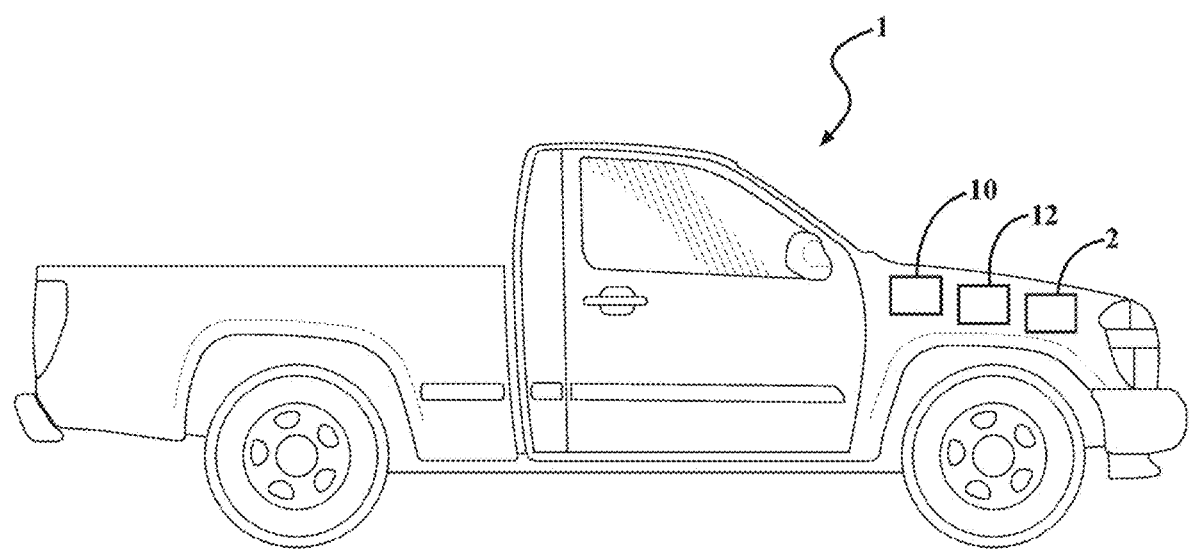
FIG. 1B is an illustrative view depicting a vehicle including a belt drive system shown in FIG. 1A.

FIG. 1A schematically illustrates a belt drive system 10 for transferring torque between an internal combustion engine 12 (engine) and a rotary motor 14. In one configuration, the engine 12 is configured to generate a propulsion power for a powertrain system 16 that is deployed on a vehicle 1 (shown in FIG. 1B). For illustrative purposes, the vehicle 1 is shown as a heavy duty truck, but it should be appreciated that the principles of the belt drive system 10 may be incorporated in any vehicle, to include a passenger vehicle, a light-duty, a utility vehicle, an agricultural vehicle, an industrial/warehouse vehicle, or a recreational off-road vehicle. The vehicle 1 may further include a hybrid operating system (HOS) 18 wherein a battery 2 may be used to assist in the propulsion of the vehicle 1 as well as power various vehicle loads. The HOS 18, among other features, may be configured to balance power transfer between the rotary motor 14 and the engine 12 to achieve a predetermined energy efficiency among the battery and fuel.

The engine 12 may be a multi-cylinder internal combustion engine 12 having at least three cylinders that converts fuel to mechanical torque through a thermodynamic combustion process. The engine 12 is equipped with a plurality of actuators and sensing devices (none shown) for monitoring operation of the engine 12 and delivering fuel to produce in-cylinder combustion charges. The combustion charges generate an expansion force that is transferred via pistons and connecting rods (none shown) to a crankshaft 20 to produce torque, which drives wheels of the vehicle 1.

Operation of the engine 12 and the rotary motor 14 are controlled by a controller unit 22. It should be appreciated that the controller unit 22 may be individual processing units, which include the HOS 18, an engine control unit 22a, and a motor torsional control unit 22b. The controller unit 22 performs processing to actuate the respective engine 12 and rotary motor 14 in response to input from various vehicle components. For example, the controller unit 22 may increase or decrease fuel to the engine 12 in response to a pedal or brake command, or increase or decrease an acceleration of the rotary motor 14 in response to the pedal or brake command.

The belt drive system 10 includes a belt run 26 having a first pulley 28 and a second pulley 30. The first pulley 28 is mounted on the crankshaft 20 of the engine 12. The crankshaft 20 may be coupled to a transmission (not shown) on the rear of the engine 12. The transmission may be a step-gear transmission that is configured to transfer engine speed and torque at one of a plurality of fixed gear ratios in response to operator inputs.

The engine 12 may include a low-voltage, solenoid-actuated electrical starter (not shown) that aids in starting the engine 12 in response to a key-crank event. The engine 12 may be configured to execute engine stop/start operations, including executing auto-start and auto-stop routines during vehicle operation. The engine 12 may be configured to execute auto-start and auto-stop control routines, fuel cutoff (FCO) control routines, active fuel management routines, and dynamic fuel management including cylinder deactivation control routines and cylinder skip-fire routines during ongoing operation.

The second pulley 30 is mounted on the front of the rotary motor 14. The rotary motor 14 may be any suitable electric motor/generator device that electrically couples via an inverter to a DC power source, in one configuration. The rotary motor 14 may include a permanent magnet electric motor or, alternatively, may include an induction motor. The rotary motor 14 is configured to convert stored electric energy to mechanical power and convert mechanical power to electric energy. The DC power source may be any high-voltage, energy storage device such as a multi-cell lithium ion device, an ultracapacitor, or another suitable energy storage device without limitation. Alternatively, another non-combustion torque machine, such as a pneumatically powered device or a hydraulically powered device may be employed in place of the rotary motor 14. By way of definition, a non-combustion torque machine is any device capable of generating torque by converting a potential energy source to kinetic energy without combustion of the potential energy. Non-limiting examples of the potential energy source may include electric energy, pneumatic energy, and hydraulic energy.

The belt drive system 10 further includes a flexible, continuous serpentine belt 24 that is arranged in the belt run 26. The belt drive system 10 may also include various conventional tensioning devices to reduce slack in the belt 24. For instance, the belt drive system 10 may include a tensioner pulley 32, first and second idler pulleys 34, 36, and a hydraulic strut tensioner 38 including a strut tensioner pulley 40, which are suitably positioned in the belt run 26 over which the serpentine belt 24 travels. Alternatively, the belt drive system 10 may include any suitable configuration that includes a serpentine belt 24 that is arranged to transfer torque between the engine 12 and the rotary motor 14 and includes the hydraulic strut tensioner 38 described herein.

The controller unit 22 is in communication with sensors and also in communication with actuators. As used herein, the term "controller unit 22" is made in reference to an engine control module configured to process information from the sensors to generate instructions, processes, and logic flows for the operation of actuators to control operation of the engine 12 and the electric machine in response to operator commands. It should be appreciated that the operator commands may place the rotary motor 14 out-of-phase with the engine 12 such that the rotary speed of the rotary motor 14 is different than a rotary speed of the crankshaft 20.

The rotary motor 14 and the crankshaft 20 may be out-of-phase with each other for a multitude of reasons. For example, the rotary motor 14 and the crankshaft 20 may be out-of-phase in response to a user-initiated braking command, a user-initiated accelerating command, or during active fuel management operations and the like.

The controller unit 22 is operatively connected to the rotary motor 14 and includes data processing hardware 50 and memory hardware 52. The memory hardware 52 stores instructions that when executed on the data processing hardware 50 cause the data processing hardware 50 to perform operations that include applying a torque to the rotary motor 14 and changing the torque of the rotary motor 14 prior to a change in a rotary speed of the internal combustion engine 12 to maintain a predetermined tension in the belt 24 and reduce a torsional load on the internal combustion engine 12. The controller unit 22 may process various vehicle operating conditions and parameters to change the torque of the rotary motor 14 prior to a change in the rotary speed of the internal combustion engine 12. For instance, the controller unit 22 may change the torque of the rotary motor 14 when the crankshaft 20 of the internal combustion engine 12 operates at a predetermined range or band of Revolutions Per Minute ("RPM"), or predetermined frequency. Further, it should be appreciated that the operating conditions and parameters may change based upon the size and type of the internal combustion engine 12. Thus, the controller unit 22 may change the torque of a rotary motor 14 coupled to a four-cylinder internal combustion engine 12 at an RPM range that is different than an RPM range of an eight-cylinder internal combustion engine 12.

Figure 2:
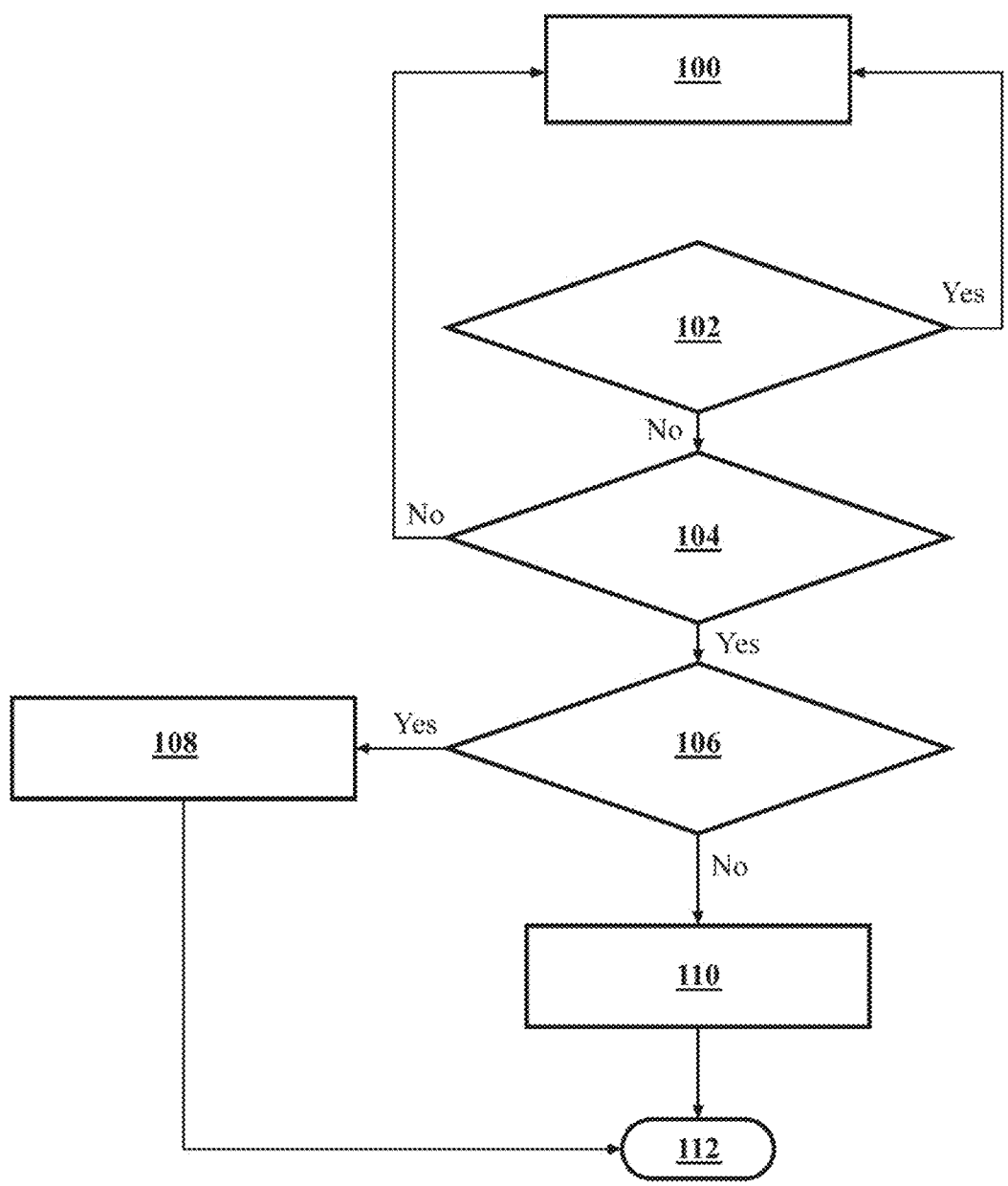
FIG. 2 is a functional block diagram of an example belt drive system in accordance with the principles of the present disclosure for use for use in conjunction with the belt drive system of FIG. 1A.

With reference now to FIG. 2 a flow chart depicting the operation of the system 10 is provided. The operation of the system 10 is controlled by the controller unit 22. At block 100, a torsional control command is generated by a torsional control module 42. The torsional control command includes a set of instructions for the rotary motor 14 to execute. The torsional control module 42 may reside within the controller unit 22 or separately. The torsional control module 42 generates the torsional control command by processing a torque command generated by a component of the vehicle operating system 10, such as the HOS 18.

The HOS 18 may generate the torque command by processing various vehicle information to achieve one of a plurality of objectives. For instance, the torque command may be generated based upon an objective to charge the battery in instances where the state of charge of the battery is below a predetermined threshold. However, in instances where the state of charge of the battery is below a predetermined threshold, but the electrical load demand of the vehicle is also below a predetermined threshold, the objective of the HOS 18 may change to generate a boost torque to drive the engine 12. Accordingly, it should be appreciated that the torque command is a dynamic value that changes based upon numerous factors which, when processed, achieves an energy efficiency between the battery, fuel, and driving demands.

The torsional control command is transmitted to the rotary motor 14 to operate the rotary motor 14 in accordance with the torsional control command. The torsional control command is calculated by the controller unit 22 based on vehicle operating conditions such as engine speed, engine spark timing, manifold pressure, belt condition, angle of the crankshaft 20, and the like. The vehicle operating conditions may be detected by using various sensors associated with the vehicle and vehicle components. In addition, the vehicle operating conditions may also be processed to determine whether the vehicle is operating in a Dynamic Fuel Management ("DFM") condition or an Active Fuel Management condition ("AFM"), wherein the actuation of the pistons are individualized to meet the objectives of the DFM and the AFM, respectively. It should be appreciated that the listed vehicle operating conditions-on which the torsional control command is based—are exemplary and do not constitute an exhaustive list of possible operating conditions that could be used by the controller unit 22 in determining the torsional control command.

The controller unit 22 processes diagnostic checks to determine whether or not to modify the torque command generated by the HOS 18. For instance, at block 102, the controller unit 22 processes a diagnostic check of the belt 24 to determine if the belt 24 is slipping. The diagnostic check may be done by using a pulley sensor 44 or a strut tensioner sensor 46. If the belt 24 is slipping, the process returns to block 100, in which case the torque command is not modified.

Another diagnostic check is disclosed at block 104, wherein information from a crankshaft sensor 48 is processed to determine the Rotations per Minute ("RPM") of the crankshaft 20 and/or the position of the crankshaft 20. If the crankshaft 20 is operating within a target range of RPMs, the controller unit 22 proceeds to block 106. If the crankshaft 20 is operating outside of the target range of RPMs, the process returns to block 100. It should be appreciated that the target range of RPMs may be based upon various factors which include, engine size, the number of cylinders, the arrangement of the cylinders (i.e., inline, V, etc.), the driving mode of the vehicle, and the like.

Another example of a diagnostic check is disclosed at block 106 wherein a vehicle operating mode is processed. In particular, the diagnostic check may be configured to determine the operating routine of the engine 12 such as the number of cylinders active during the operation of the engine 12. For example, for vehicles equipped with DFM, it is determined whether or not the vehicle is operating in a DFM mode. Irrespective of whether or not the vehicle is operating in a DFM mode, the controller unit 22 modifies the torque command. In instances where the vehicle is operating in a DFM mode, the process proceeds to block 108 wherein the controller unit 22 modifies the torque command to adjust for the active and inactive cylinders. The modified torque command is then transmitted to the rotary motor 14 at block 112. In instances where the vehicle is not operating in a DFM mode, the process proceeds to block 110 wherein the controller unit 22 modifies the torque command to account for all of the cylinders. The modified torque command is then transmitted to the rotary motor 14 at block 112. It should be appreciated that the diagnostic check may also be performed to determine if a vehicle is operating in an AFM mode.

For illustrative purposes, the belt drive system 10 is discussed in the context of a hybrid vehicle having an internal combustion engine 12 with eight cylinders arranged in a V-shape and coupled to the rotary motor 14. The belt 24 is disposed in a belt run 26 that includes a first pulley 28 coupled to the crankshaft 20 of the internal combustion engine 12 and a second pulley 30 coupled to the rotary motor 14. The vehicle includes the HOS 18, which is configured to balance the transfer of energy between the engine 12 and the rotary motor 14 to charge the battery and assist in the propulsion of the vehicle.

The belt drive system 10 further includes the controller unit 22 that is operatively connected to the rotary motor 14 and transmits instructions to the rotary motor 14. The controller unit 22 includes data processing hardware 50 and memory hardware 52. The memory hardware 52 stores instructions that when executed on the data processing hardware 50) cause the data processing hardware 50 to perform operations including applying a torque to the rotary motor 14 and changing the torque of the rotary motor 14 prior to a change in a rotary speed of the internal combustion engine 12 to maintain a predetermined tension in the belt 24 and reduce rotary motor torsional response through the belt drive to the torsional vibration input from the internal combustion engine 12. For example, the controller unit 22 may be configured to increase the torque of the rotary motor 14 prior to an acceleration of the crankshaft 20 of the internal combustion engine 12. In such an aspect, the controller unit 22 generates a torsional control instruction, which is carried out by the rotary motor 14. The torsional control instruction includes rotary speed and direction commands and may be generated by a torque command issued by the HOS 18.

The torque command may be one of a generative torque and a boost torque. It should be appreciated that either the generative torque or the boost torque may be modified. Not only does the system 10 contemplate the modification of a torque command, but also the timing of the execution of the modified torque command. For instance, the controller unit 22 is configured to instruct the rotary motor 14 to provide a modified boost torque prior to a piston expansion and a modified generative torque prior to a cylinder compression event. The modified boost torque and the modified generative torque may be asymmetric with respect to each other. For instance, when the vehicle is operating in the DFM mode and the engine 12 performs skip fire operations wherein predetermined pistons are not fired, the value of modified boost torque and the modified generative torque are different from each other. Further, the timing at which the modified boost torque and the modified generative torque are processed by the rotary motor 14 are synchronized with the skip-fire operation of the engine 12. It should be appreciated that in some instances, the modified torque command may be configured to maintain the torque of the rotary motor 14 when a cylinder of the internal combustion engine 12 does not fire.

Figure 3:
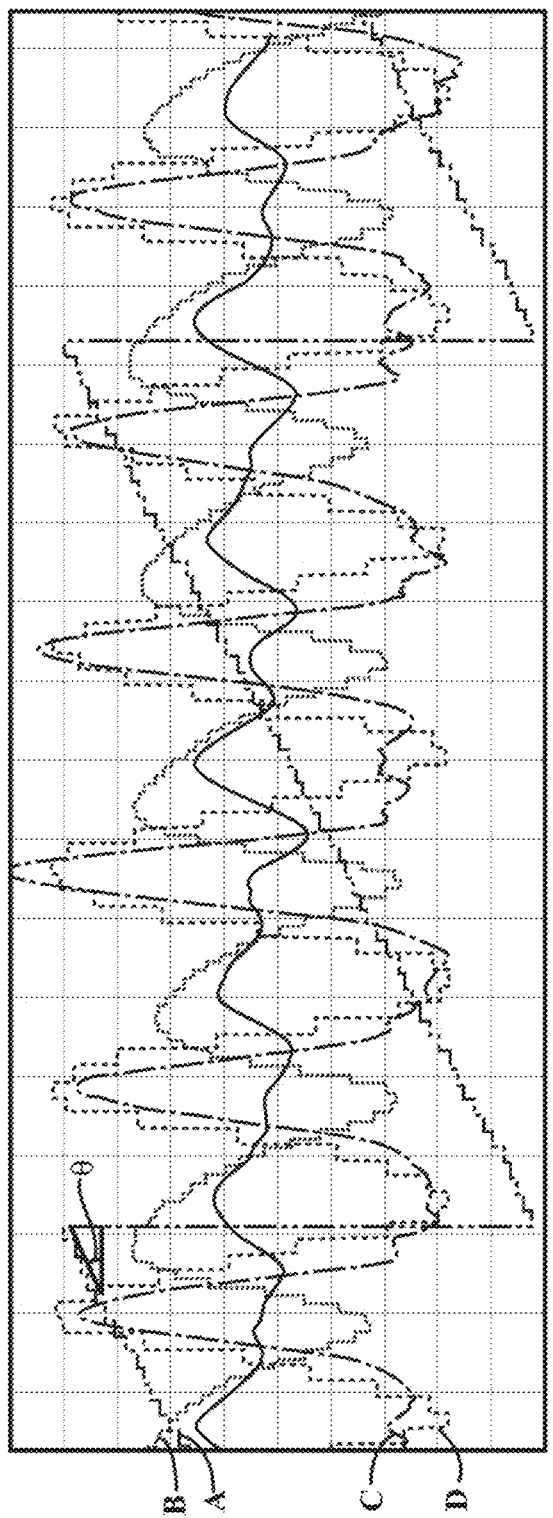
FIG. 3 is a graph showing a profile of a torque command in reference to a position of a crankshaft.

FIG. 3 depicts a graph showing the torque achieved and the RPMs of the crankshaft 20 with respect to the angle of the crankshaft 20. The waveform showing the RPMs of the crankshaft 20 may be interpolated to show a compression and expansion cycle of the cylinder, wherein a crest of the waveform is an end of an expansion event of the cylinder and the trough of the waveform is an end of a compression event of the cylinder. The controller unit 22 may be configured to modify the torque command and control the rotary motor 14 to operate in accordance with the modified torque command based upon an angular position of the crankshaft 20. It should be appreciated that the optimal angular position may be determined based upon the configuration of the system 10. For exemplary purposes, the controller unit 22 is implemented in a four-cylinder vehicle with a HOS 18. In such a configuration, the controller unit 22 may be configured to modify the torque command and process the modified torque command when the crankshaft 20 is between 42 and 50 degrees before top dead center. In the four-cylinder vehicle, the modified torque command is processed and actuated by the rotary motor 14 when the crankshaft 20 is at approximately 45 degrees before top dead center. However, it should be appreciated that the timing in which the modified torque command is processed and actuated by the rotary motor 14 may be based upon various factors to include engine and spark, speed, operating speed, atmospheric pressure, and the like. The belt drive system 10 may further include a crank sensor configured to detect the angular position of the crankshaft 20.

FIG. 3 shows the measured modified torque command being applied prior to a cylinder expansion and a cylinder compression. In particular, the measured torque is shown as increasing to its peak prior to a crankshaft 20 acceleration of the internal combustion engine 12, as indicated by an increase in the RPMs of the crankshaft 20. The rise in the waveform of the measured torque is commensurate with a boosting torque and the decline in the waveform of the measured torque is commensurate with a generative motoring torque. Thus, FIG. 3 illustrates how the modified torque command instructs the rotary motor 14 to generate a modified boost torque command prior to a cylinder combustion (as indicated by the crest of the waveform showing the RPMs of the crankshaft 20) and a modified generative torque command prior to a cylinder compression (as indicated by the trough of the waveform showing the RPMs of the crankshaft 20).

As shown in FIG. 3, the modified torque command is actuated by the rotary motor 14 prior to an expansion of the piston. Further, the torque achieved by the rotary motor 14 prior to an expansion of the piston is applied when the crankshaft 20 position is approximately 45 degrees before top dead center. It should be appreciated by those skilled in the art that the timing of the application of the modified torque command is based upon the operating parameters (such as engine spark, engine speed, atmospheric pressure and the like) of a four-cylinder engine and may deviate from 45 degrees before top dead center. For example, the application of the modified torque command may be 47 degrees before top dead center for an eight-cylinder engine.

The modified torque command is actuated by the rotary motor 14 to bring the rotary motor 14 in-phase with the engine 12 prior to the engine 12 and the rotary motor 14 becoming out-of-phase. In so doing, the modified torque command reduces torsional response of the rotary motor 14, the load on the rotary motor 14 which, in turn, reduces rotary motor torsional response through the belt drive to the torsional vibration input from the engine 12. It should be appreciated that the controller unit 22 may be further configured to modify the torque command to reduce a torsional load on other components of the belt system 10. For instance, in vehicle configurations where the belt system 10 may include a strut tensioner 38, the controller unit 22 may be further configured to process a load on the strut tensioner 38 to modify the torque command to reduce a torsional load on the strut tensioner 38.

The controller unit 22 provides an instruction to the rotary motor 14 to provide a boost torque (motoring torque) or regenerative torque (braking torque), which is transferred to the engine 12 through the crankshaft 20 by virtue of connection with the belt 24. The controller unit 22 is further configured to process vehicle operating conditions to generate the boost torque command and generative torque command and adjust the boost torque and generative torque prior to conditions that would result in a change in the tension of the belt 24 to maintain the belt 24 in a predetermined tension. The foregoing may be accomplished by the controller unit 22 by adjusting a rotary speed of the rotary motor 14 to reduce a rotary motor torsional response through the belt drive 26 to the torsional vibration input from the internal combustion engine 12.

Figure 4:
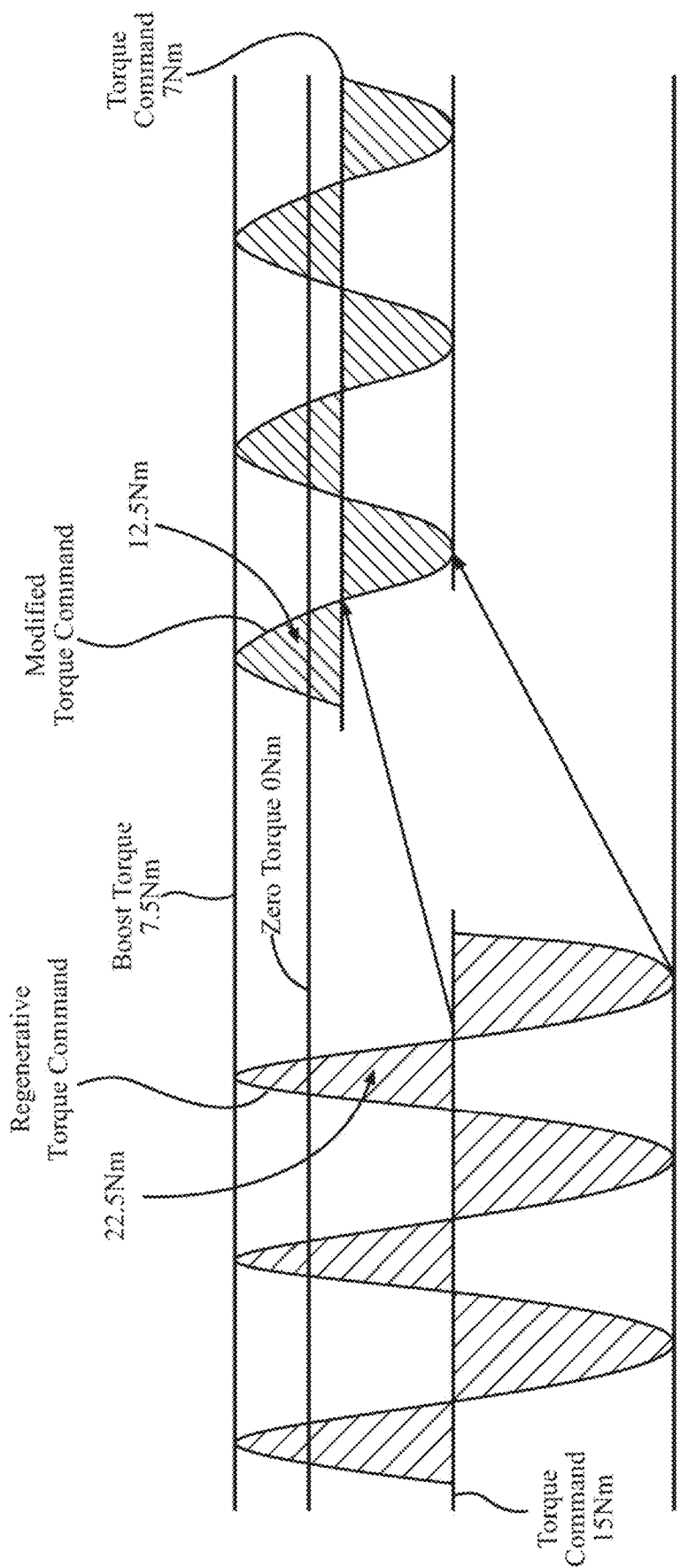
FIG. 4 is a graph depicting the modified torque command relative to the torque command.

With reference now to FIG. 4, a description of the operation of the modified torque command is provided. FIG. 4 shows that the HOS 18 provides a torque command which is in direct current form. In one instance, the torque command is a regenerative torque command of negative 15 Nm. The waveform illustrates the modification of the torque command which is in alternating current form, wherein the torque is increased prior to a combustion event for a particular cylinder. The 15 Nm generative torque is modified to a 7.5 Nm torque command. That is, the area of the waveform above the negative 15 Nm meter regenerative torque command is commensurate with the modified boost torque command. To maintain the efficiency of the vehicle, the modified boost torque command is the minimum torque required to bring the rotary motor 14 in phase with the crankshaft 20, applied in a boost prior to a cylinder expansion, and does not exceed the torque command value of 7 Nm. In this example, the area above and below the negative 15 Nm generative torque command is 22.5 Nm, of which the area below the zero torque line is used to charge the battery. The generative torque command may be accomplished by either a deceleration of the rotary motor 14 or a change in the direction of the rotary motor 14. The energy is reclaimed by a modified generative torque command, which is the area of the waveform underneath the negative 15 Nm meter generative torque command, which occurs prior to a compression event of the cylinder.

FIG. 4 depicts a waveform of the modified torque command issued by the HOS 18, wherein the modified torque command remains at 7.5 Nm but the generative torque command is changed to negative 5 Nm. In particular, the waveform on the right is different from the waveform on the left with respect to both amplitude and length. However, the principles are the same in that the waveform is increased relative to the negative 5 Nm generative torque command to meet the 7.5 Nm boost torque command, and energy is reclaimed by a modified generative torque command, which is the area of the waveform underneath the negative 5 Nm meter generative torque command. In both cases, the modified boost torque command does not exceed the modified torque command value of 7.5 Nm.

FIG. 4 depicts a modified torque command as applied to a cylinder having a combustion and compression event (i.e., a firing cylinder). However, in the event that the vehicle is operating in a DFM or AFM mode, the torque command issued by the HOS 18 is not modified for cylinders which are not active. It should be appreciated that the modification of the torque command is not performed based upon the operating conditions of the vehicle as disclosed above in reference to FIG. 2.

Figure 5:
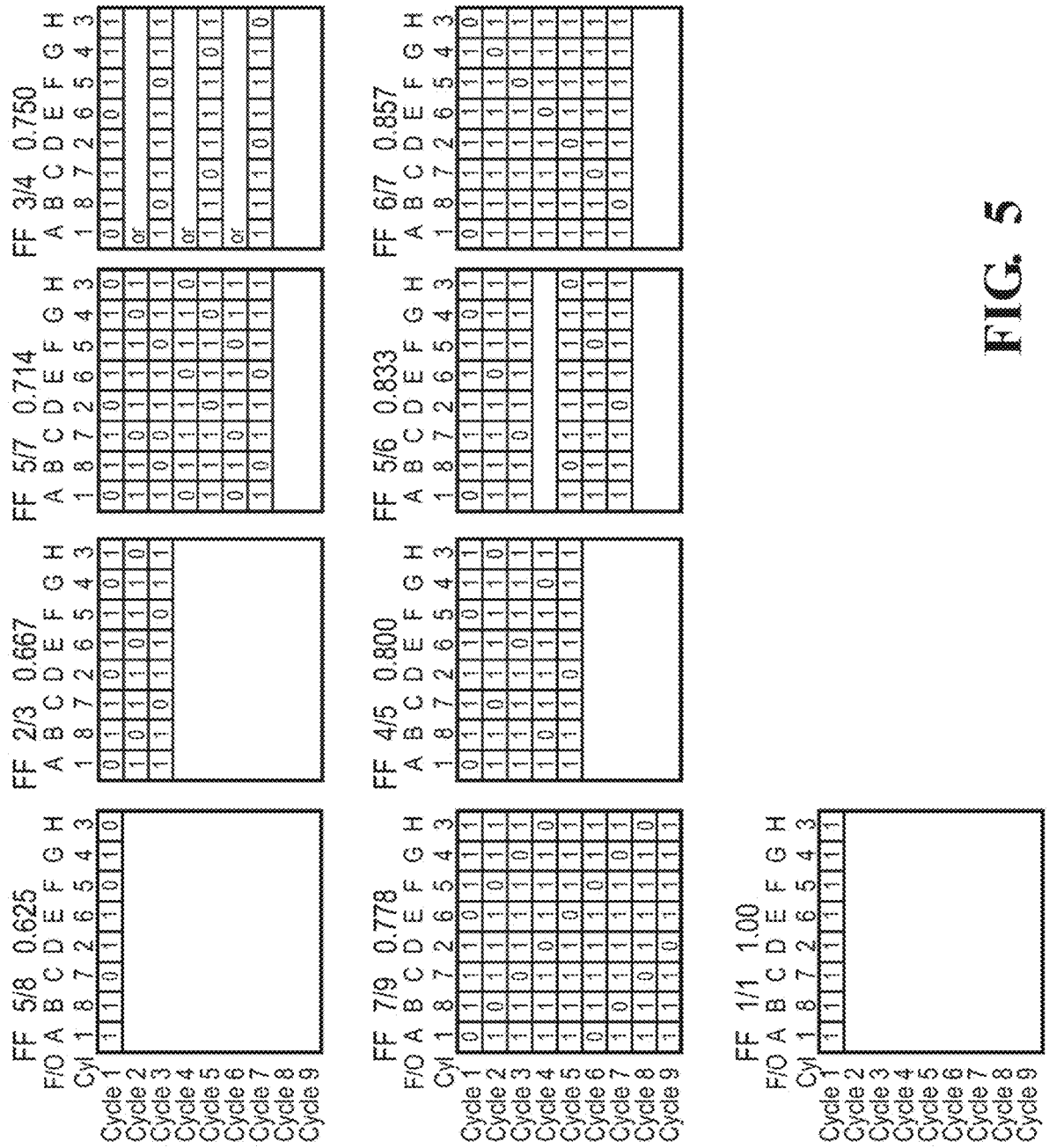
FIG. 5 is a table showing the operation of cylinders with respect to an engine cycle during a dynamic fuel management mode.

FIG. 5 depicts tables of the engine 12 cycles of the exemplary vehicle described herein. In particular, the tables show the engine cycle of the engine 12 operating in a DFM mode. In the DFM mode, only certain cylinders are activated or are firing, as indicated by the number "1" based upon the cycle of the engine 12. The cylinders that are not firing or are inactive are indicated by the number "0." The modification of the torque command is only performed on the activated cylinders. The modified torque command may be configured to maintain the torque of the rotary motor 14 when a cylinder of the internal combustion engine 12 does not fire. The modification of the torque command for a respective cylinder may not be the same to account for the number and timing of non-active cylinders. Thus, the modified boost torque and the modified generative torque are asymmetric with respect to each other to provide a neutral state of charge of the battery.

Figure 6:
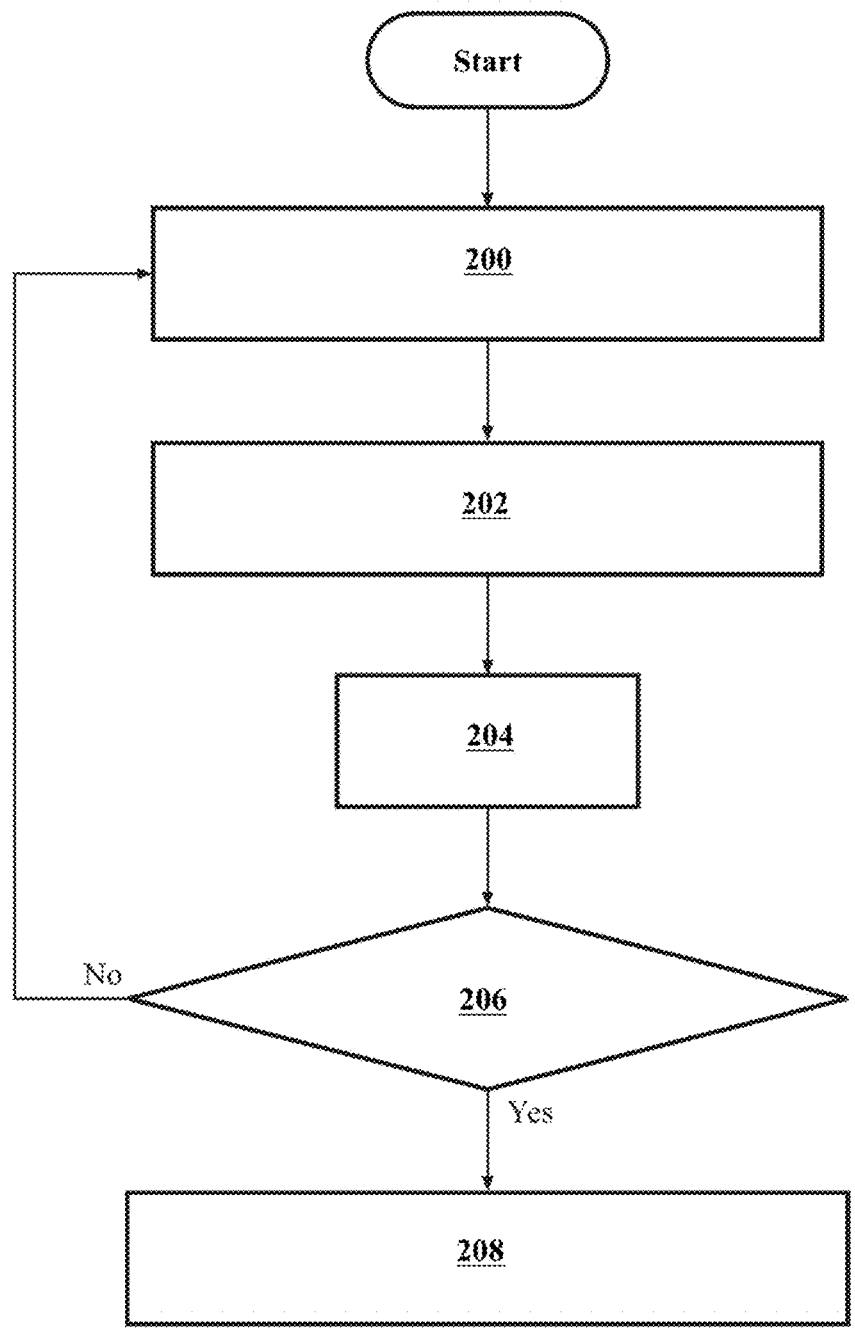
FIG. 6 is a flow chart showing the steps of a method for reducing torsional load on an engine.

With reference now to FIG. 6, a method for controlling operation of a rotary motor 14 that is rotatably coupled to an internal combustion engine 12 via a belt 24 is provided. The method includes actuating the rotary motor 14 to apply a torque to the internal combustion engine 12 through the belt 24 at block 200. Actuating the rotary motor 14 may be done by the controller unit 22, which instructs the rotary motor 14 to execute a torsional command. As discussed above, the torsional command may be generated by processing a torque command generated by a vehicle operating system 10 such as the HOS 18.

The method proceeds to block 202 wherein a change in a rotary speed of the internal combustion engine 12 is determined or otherwise detected. The rotary speed may be determined by processing various engine 12 parameters to calculate the rotary speed of the crankshaft 20 of the engine 12, or may be detected by using conventional sensors such as a crankshaft sensor 48.

The method includes changing the torque of the rotary motor 14 prior to the change in a rotary speed of the internal combustion engine 12 at block 208. In one aspect, the torque of the rotary motor 14 may be changed by modifying the torque command generated by the HOS 18. Preferably, the torque command is modified to produce a torque of the rotary motor 14 which maintains a predetermined tension in the belt 24, thereby reducing a rotary motor torsional response through the belt drive to the torsional vibration input from the engine 12.

The method may include performing a diagnostic check at block 204. The diagnostic check is configured to determine if the vehicle operating conditions are suitable for modifying the torque command issued by the HOS 18. As discussed above with reference to FIG. 2, the system 10 may not modify the torque command in instances where the belt 24 is slipping or the RPMs of the crankshaft 20 are not within a predetermined threshold. At block 206 the method determines if conditions for modifying the torque command are present. If not, the torque command is not modified and the method proceeds to block 200. If conditions for modifying the torque command are present, then the method proceeds to block 208.

In one aspect of the method, the torque command is modified and executed by the rotary motor 14 to increase the torque of the rotary motor 14 prior to a crankshaft acceleration of the internal combustion engine 12. In such an aspect, the controller unit 22 may process a change in the RPM of the crankshaft 20 to detect or otherwise determine the crankshaft acceleration.

As discussed above, the torque command may be one of a boost torque command or a generative torque command. The generative torque command may be an instruction to decelerate the rotary motor 14 or may be an instruction to decreasing a torque of the rotary motor 14 prior to a crankshaft deceleration of the internal combustion engine 12.

In one aspect of the method, the modified torque command instructs the rotary motor 14 to generate the boost torque command prior to a cylinder expansion wherein the rotary motor 14 is accelerated prior to the cylinder expansion. The modified torque command may also instruct the rotary motor 14 to generate the generative torque command prior to a cylinder compression wherein the rotary motor 14 is decelerated or reversed prior to the cylinder compression.

In yet another aspect, the modified boost torque command and the modified generative torque command are asymmetric with respect to each other. As discussed above, the modified boost torque command and the modified generative torque command may be of different value and different timing based upon the operation of the cylinders in a DFM mode or AFM mode, as illustrated in FIG. 5.

In one aspect, the torque command is not modified for a cylinder that is not actuated or operating. Thus, the torque of the rotary motor 14 is maintained when a cylinder of the internal combustion engine 12 does not fire.

In yet another aspect of the method, the angular position of the crankshaft 20 is detected. The angular position of the crankshaft 20 may be detected using a crankshaft sensor 48. The torque command may be modified and executed by the rotary motor 14 based on the angular position of the crankshaft 20. For instance, the torque command is modified and the modified torque command is executed by the rotary motor 14 prior to a cylinder expansion and may be applied when the crankshaft 20 is between 42 and 50 degrees before top dead center based upon various engine operating parameters such as spark speed, operating speed, atmospheric pressure and the like.

A system and method provided herein reduces a rotary motor torsional response through the belt drive to the torsional vibration input from the engine 12 by modifying a torque command prior to the occurrence of a torsional vibration to the engine 12. In particular, the modified torque command is forward fed to keep a rotary motor in-phase with the crankshaft 20 of the engine 12. For instance, the modified torque command is actuated by the rotary motor to precede a crankshaft acceleration of the engine. The system and method contemplates various vehicle parameters and operating conditions which may be processed to determine if the torque command should be modified, the value of the modified torque, the timing of the generation of the modified torque, and to which engine cylinder the modified torque should be applied. For instance, the system and method may be configured to time the processing of the modified torque command prior to a piston expansion and a piston compression, wherein a boost torque command is modified and processed prior to a piston expansion and a generative torque command is modified and processed prior to a piston compression. The modified torque command may be delivered to a selected piston or all the pistons based upon an operating condition of the vehicle. For instance, if the engine is operating in a dynamic fuel management condition, the torque command is modified and applicable to the active or otherwise firing piston(s).

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A belt drive system for an internal combustion engine rotatably coupled to a rotary motor, the internal combustion engine including at least three cylinders each having a piston operable to turn a crankshaft, the belt drive system comprising:

a belt disposed in a belt run that includes a first pulley coupled to a crankshaft of the internal combustion engine and a second pulley coupled to the rotary motor; and a controller operatively connected to the rotary motor and including data processing hardware and memory hardware, the memory hardware storing instructions that when executed on the data processing hardware cause the data processing hardware to perform operations comprising:

applying a torque to the rotary motor; and changing the torque of the rotary motor prior to a change in a rotary speed of the internal combustion engine to maintain a predetermined tension in the belt and reduce a rotary motor torsional response through the belt to a torsional vibration input from the engine.

2. The belt drive system of claim 1, wherein the controller is configured to increase torque of the rotary motor prior to a crankshaft acceleration of the internal combustion engine.

3. The belt drive system of claim 1, wherein the controller is configured to decrease a torque of the rotary motor prior to a crankshaft deceleration of the engine.

4. The belt drive system of claim 3, wherein the controller is configured to instruct the rotary motor to provide an accelerating torque prior to a piston expansion and a regenerative torque prior to a piston compression.

5. The belt drive system of claim 4, wherein the accelerating torque and the regenerative torque are asymmetric with respect to each other.

6. The belt drive system of claim 1, wherein the controller is configured to maintain the torque of the rotary motor when a cylinder of the internal combustion engine does not fire.

7. The belt drive system of claim 1, wherein the controller is configured to change the torque with respect to an angular position of the crankshaft.

8. The belt drive system of claim 7, wherein the controller is configured to change the torque when the crankshaft is between 42 and 50 degrees before top dead center of the crankshaft.

9. The belt drive system of claim 8, further including a crank sensor configured to detect the angular position of the crankshaft.

10. The belt drive system of claim 5, wherein the accelerating torque and the regenerative torque are asymmetric with respect to each other to retain a net zero energy balance.

11. A method for controlling operation of a rotary motor that is rotatably coupled to an internal combustion engine via a belt, the method comprising:

actuating the rotary motor to apply a torque to the internal combustion engine through the belt;

determining a change in a rotary speed of the internal combustion engine; and changing the torque of the rotary motor prior to the change in a rotary speed of the internal combustion engine to maintain a predetermined tension in the belt and reduce a rotary motor torsional response through the belt to a torsional vibration input from the internal combustion engine.

12. The method of claim 11, wherein torque of the rotary motor is increased prior to a crankshaft acceleration of the internal combustion engine.

13. The method of claim 11, further including the step of decreasing a torque of the rotary motor prior to a crankshaft deceleration of the internal combustion engine.

14. The method of claim 13, wherein the rotary motor generates an accelerating torque prior to a piston expansion and a regenerative torque prior to a piston compression.

15. The method of claim 14, wherein the accelerating torque and the regenerative torque are asymmetric with respect to each other to retain a net zero energy balance.

16. The method of claim 11, wherein the torque of the rotary motor is maintained when a cylinder of the internal combustion engine does not fire.

17. The method of claim 11, further including the step of detecting an angular position of a crankshaft of the internal combustion engine.

18. The method of claim 17, wherein the torque of the rotary motor is changed with respect to the angular position of the crankshaft.

19. The method of claim 18, wherein the torque of the rotary motor is changed when the crankshaft is between 42 and 50 degrees before top dead center of the crankshaft.

20. The method of claim 11, wherein changing the torque of the rotary motor prior to the change in a rotary speed of the internal combustion engine is performed by modifying a torque command.

* * * * *